United States Patent [19]
White et al.

[11] Patent Number: 6,108,749
[45] Date of Patent: Aug. 22, 2000

[54] DASD FILE COPY SYSTEM FOR A DATA PROCESSOR USING A DATA STORAGE SUBSYSTEM SNAPSHOT COPY CAPABILITY

[75] Inventors: Michael Wayne White, Lafayette; Patrick James Tomsula, Arvada, both of Colo.

[73] Assignee: Storage Technology Corporation, Louisville, Colo.

[21] Appl. No.: 08/844,046

[22] Filed: Apr. 18, 1997

[51] Int. Cl.[7] .............................. G06F 12/00; G06F 13/00
[52] U.S. Cl. ......................... 711/112; 711/111; 711/161; 711/162
[58] Field of Search .................................. 711/161, 162, 711/111, 112, 4

[56] References Cited

U.S. PATENT DOCUMENTS

| | | | |
|---|---|---|---|
| 5,212,784 | 5/1993 | Sparks | 395/575 |
| 5,255,270 | 10/1993 | Yanai et al. | 371/10.2 |
| 5,276,860 | 1/1994 | Fortier et al. | 395/575 |
| 5,630,092 | 5/1997 | Carreiro et al. | 395/438 |
| 5,649,152 | 7/1997 | Ohran et al. | 395/441 |
| 5,742,792 | 4/1998 | Yanai et al. | 395/489 |

FOREIGN PATENT DOCUMENTS

| | | | |
|---|---|---|---|
| 0 602 822 A2 | 6/1994 | European Pat. Off. | G06F 11/14 |
| 0 617 362 A1 | 9/1994 | European Pat. Off. | G06F 11/20 |

*Primary Examiner*—John W. Cabeca
*Assistant Examiner*—Tuan V. Thai
*Attorney, Agent, or Firm*—Duft, Graziano & Forest, P.C.

[57] ABSTRACT

The DASD file system copy system functions to enable the data processor to manage the data file copy function of a disk data storage subsystem in a manner that minimizes the expenditure of data processor resources. This is accomplished by the DASD file system copy system determining the source location on the data storage subsystem, the target location on the data storage subsystem and identifying the extents of both. The DASD file system copy system then transmits data to the data storage subsystem, representative of the assignment of DASD full tracks from the source location on the data storage subsystem as well as DASD full tracks from the target location on the data storage subsystem. The data processor based DASD file system copy system then uses ECAM channel programs to instruct the data storage subsystem to perform the data file copy operation using snapshot track pointer copy operations. Upon conclusion of the data file copy operation by the data storage subsystem, the DASD file system copy system updates the meta data required to complete the data file copy operation.

22 Claims, 2 Drawing Sheets

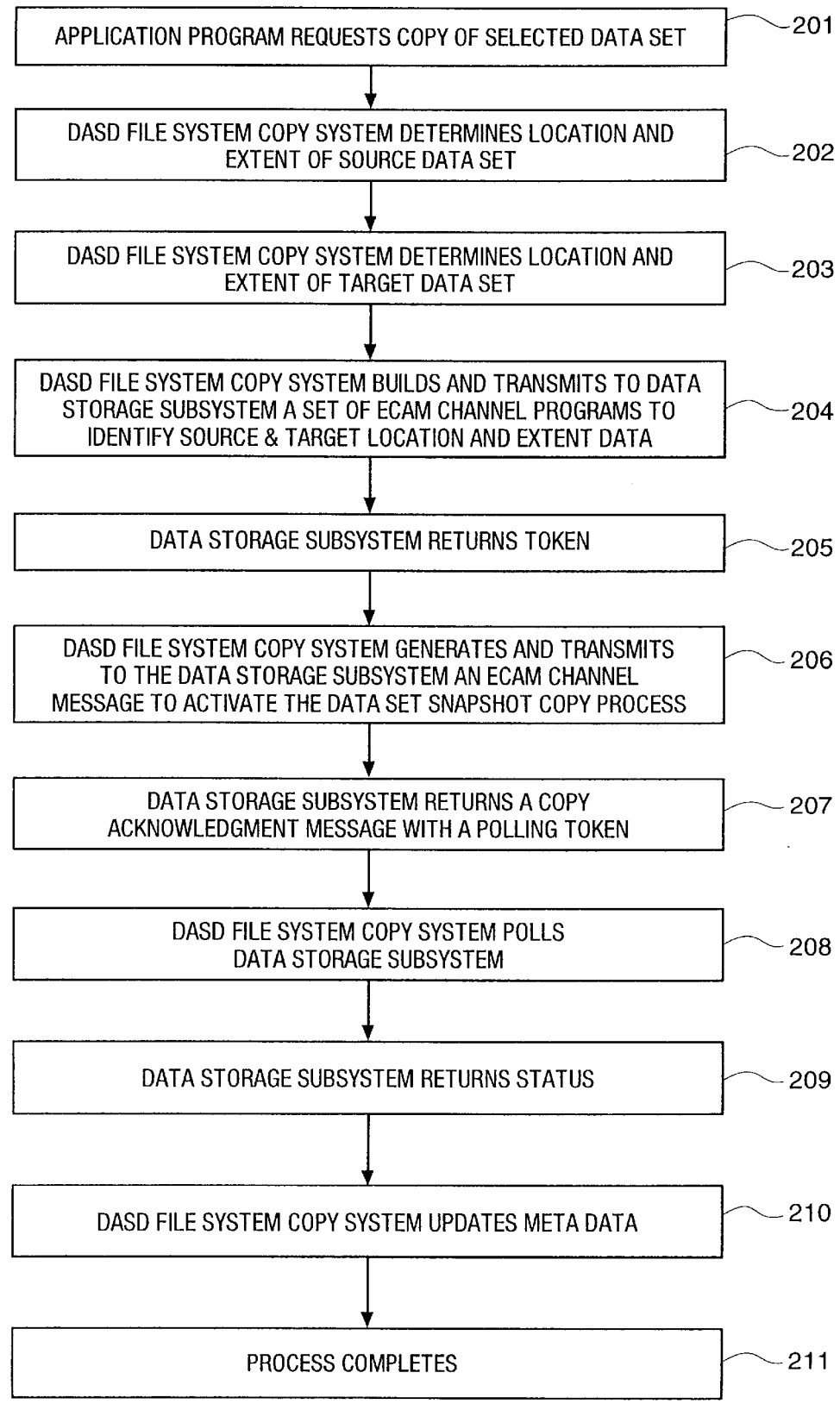

DASD FILE COPY SYSTEM FOR A DATA PROCESSOR USING A DATA STORAGE SUBSYSTEM SNAPSHOT COPY CAPABILITY

CROSS REFERENCE TO RELATED APPLICATIONS

This application is related to copending applications titled "System For Providing Write Notification During Data Set Copy" and "MVS Device Backup System For A Data Processor Using A Data Storage Subsystem Snapshot Copy Capability", filed on the same date as the present invention, Serial Numbers currently unassigned.

FIELD OF THE INVENTION

This invention relates to data storage subsystems, and, in particular, to a DASD file system copy system which is resident on a data processor and which regulates the copying of data files among the virtual data storage devices of a data storage subsystem which is connected to the data processor. The DASD file system copy system manages the designation of the source extents, target extents, target attributes (meta data) and destination data storage volumes and activates the snapshot copy resources of the data storage subsystem to perform the data file copy operation without the necessity of the data processor having to expend a significant amount of processing resources.

PROBLEM

It is a problem in the field of computer systems to efficiently process changes to and create copies of the data files stored therein. This problem is especially severe in the case of disk drive memory systems. In a typical computer system, data processors are connected to one or more data storage subsystems, which include disk drive memory systems. The data processors and their associated data storage subsystems therefore must manage the copying of data files among the volumes of the data storage subsystem in a manner that does not adversely impact the performance and efficiency of the data processor.

The copying of data files in a traditional DASD data storage subsystem entails the data processor retrieving the data file from the data storage subsystem, then writing the retrieved data file to an alternate designated data storage location in the data storage subsystem. In particular, as part of this process, DASD copy utilities or OS access methods perform data file or volume track level copies by executing a series of read and write channel programs. These channel programs read data from the data storage subsystem into memory on a data processor and then write the data back out to the data storage subsystem as a series of record level channel programs from that data processor memory. This system is resource intensive, in that the data processor expends a significant amount of resources (CPU cycles) to achieve the data file copy operation. In addition, channel resources are needed to perform the data processor based data file copy operation. Furthermore, two significant difficulties with data storage subsystems are the time required to make copies of data files and the need to maintain the consistency of the data files during the time it takes to make copies of the data files. This is a significant issue when a copy must be made of a large group of data files or data bases which are the target of a single or common application programs. The data copy is typically made for backup purposes although copies can be made for editing or other purposes. In addition, the creation and maintenance of multiple copies of data files occupies a significant quantity of available data storage subsystem space.

An alternative to the data processor controlled data file copy operation described above is the data storage subsystem snapshot copy operation described in U.S. Pat. No. 5,410,667. This snapshot copy system avoids the data file copy problems of the prior art by simply creating a duplicate data file pointer in a virtual track directory in the data storage subsystem to reference a data file that a data processor has requested the data storage subsystem to copy. This enables the data processor to access the data file via two virtual addresses while only a single physical copy of the data file resides in the data storage subsystem. The snapshot copy operation is effected without the involvement of the data processor, since it is managed solely within the data storage subsystem. However, the snapshot copy operation cannot be selected by the data processor, because it is solely within the purview of the data storage subsystem. Thus, the data processor does not understand the new copy of the data file that has been made until the data file's meta data is updated.

Thus, the two data file copy operations that are presently in use are mutually exclusive and are either data processor-based, using a significant amount of processing and channel resources, or data storage subsystem-based and operating independent of and without the knowledge of the data processor. Both of these data file copy operations represent less than optimal methods of producing a copy of a data file.

SOLUTION

The above described problems are solved and a technical advance achieved in the field by the DASD file system copy system of the present invention which functions to enable the data processor to manage the data file copy function of a disk data storage subsystem in a manner that minimizes the expenditure of data processor resources. This is accomplished by the DASD file system copy system designating the source and destination data storage volumes and then activating the snapshot copy resources of the data storage subsystem to perform the data file copy operation without the necessity of the data processor being involved in the execution details of the operation.

The implementation of the DASD file system copy system is data processor based, yet the DASD volume data file copy is performed without using data processor CPU resources to perform the actual movement of the data files. Thus, the traditional data file reads of data processor memory and the data file write channel programs are not utilized to copy data files from a source location to a target location. Instead, the DASD file system copy system determines the source volume on the data storage subsystem, the target volume on the data storage subsystem and identifies the extent of both. The DASD file system copy system then transmits data to the data storage subsystem, representative of the assignment of DASD file systems from the source location on the data storage subsystem as well as the assignment of DASD file systems from the target location on the data storage subsystem. The data processor based DASD file system copy system then uses Extended Control and Monitoring (ECAM) channel programs to instruct the data storage subsystem to perform the file system copy operation using snapshot track pointer copy operations. Upon conclusion of the file system copy operation by the data storage subsystem, the DASD file system copy system updates the meta data required to complete the file system copy operation. Meta data is the supporting volume and data file structures required by the data processor to access, identify and maintain the snapshot target status.

This DASD file system copy system is a significant departure from the prior art operation of data storage subsystems since it does not require the expenditure of a significant amount of the data processor resources. In addition, the existing data storage subsystem snapshot copy capability is used to enable the data processor to control the copying of the data files of file systems to designated data storage locations.

BRIEF DESCRIPTION OF THE DRAWING

FIG. 2 illustrates in flow diagram form the operational steps taken by the quality of service management system to implement the partition allocation function.

DETAILED DESCRIPTION

Figure 1:
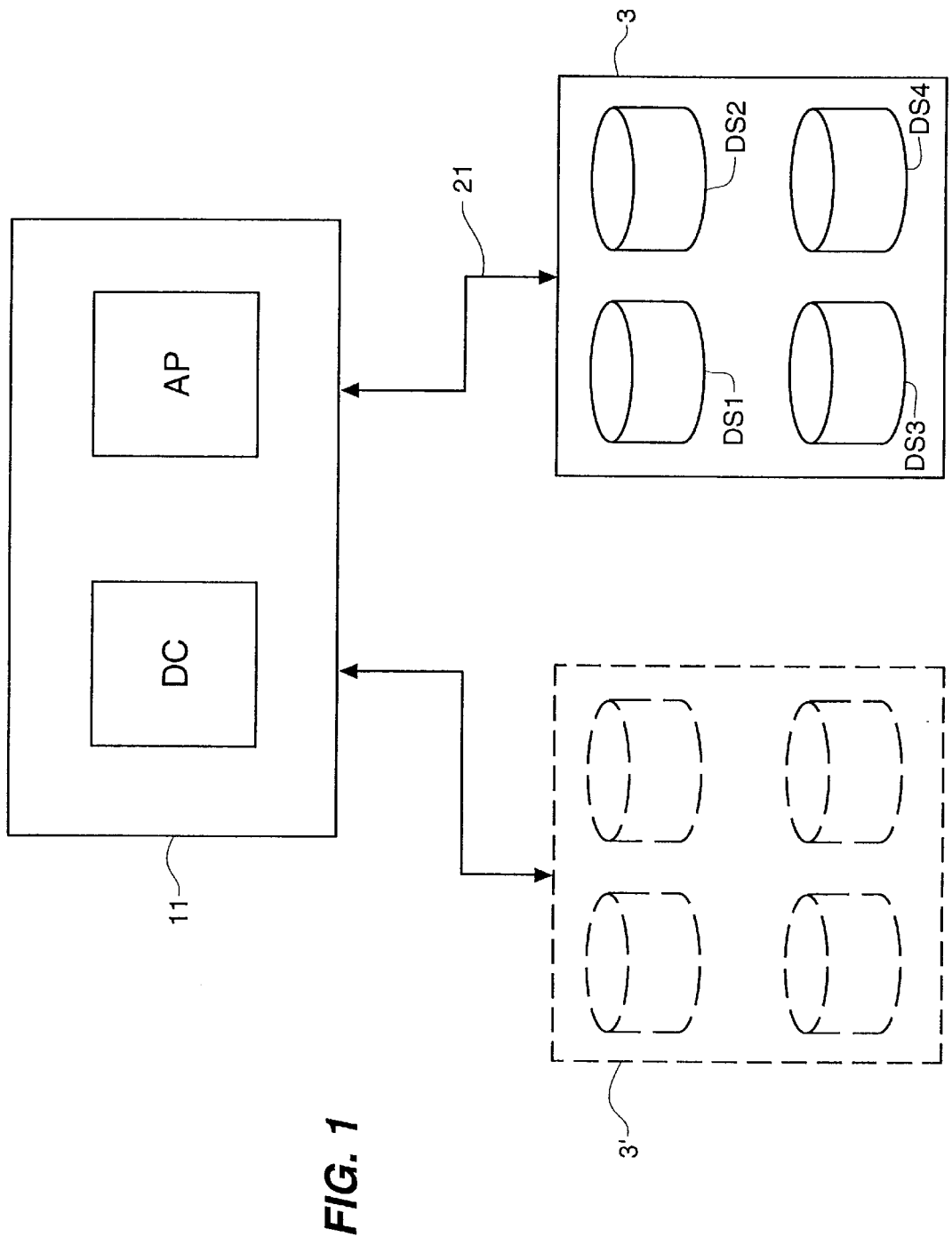
FIG. 1 illustrates in block diagram form the overall architecture of a data system which includes the DASD file system copy system of the present invention.

FIG. 1 illustrates in block diagram form the overall architecture of a computer system 1 that incorporates the DASD file system copy system DC of the present invention. The computer system 1 includes at least one data processor 11 to which are connected at least one virtual data storage subsystem (DSS) 3, 3' that contains at least one and likely a plurality of data storage devices DS1–DS4 for reading and writing data onto data storage media for use by the data processor 11. The data storage subsystem 3 comprises a dynamically mapped virtual device data storage subsystem which implements a plurality of virtual data storage devices. In the preferred embodiment of the invention disclosed herein, the data storage subsystem 3 comprises a disk drive array data storage subsystem, although any data storage technology can be used to implement the data storage subsystem 3. For the purpose of simplicity of description, the disk drive array data storage subsystem example is used herein.

Dynamically Mapped Virtual Device Data Storage Subsystem

The underlying philosophy of a dynamically mapped, virtual device data storage subsystem (such as DSS 3) provides the basis on which snapshot copy is implemented. Mapping is an important hardware issue and operates on a single device as well as multiple devices. By taking advantage of the virtual track mapping and virtual devices of the DASD subsystem, multiple logical track representations may, in fact, be a single physical track.

Mapping Tables

The data storage subsystem 3 dynamically maps between three abstract layers: virtual, logical and physical. The virtual layer functions as a conventional large form factor disk drive memory. The logical layer functions as an array of storage units that are grouped into a plurality of redundancy groups. The physical layer functions as a plurality of individual small form factor disk drives. The data storage subsystem 3 effectuates the dynamic mapping of data among these abstract layers and controls the allocation and management of the actual space on the physical devices. These data storage management functions are performed in a manner that renders the operation of the data storage subsystem 3 transparent to the data processor 11, which perceives only the virtual image of the data storage subsystem 3. A virtual device is therefore an entity addressable by data processor 11 with data processor-controlled content and data processor-managed space allocation. In this system, the virtual device consists of a mapping of a large form factor disk drive image onto a plurality of small form factor disk drives which constitute at least one redundancy group within the disk drive array. The virtual to physical mapping is accomplished by the use of a Virtual Device Table (VDT) entry which represents the virtual device. The "realization" of the virtual device is the set of Virtual Track Directory (VTD) entries, associated with the VDT entry each of which VTD entries contains data indicative of the Virtual Track Instances, which are the physical storage locations in the disk drive array redundancy group that contain the data records. The data storage management functions are performed in a manner that renders the operation of the data storage subsystems 3 transparent to data processors 11.

Data File Snapshot Copy Operation

As described in U.S. Pat. No. 5,410,667, the data storage subsystem 3 includes a track copy capability which is termed a "snapshot copy" operation. The track snapshot copy operation instantaneously creates a second instance of a selected track by merely generating a new pointer to reference the same physical memory location as the original reference pointer in the virtual track directory. In this fashion, by simply generating a new pointer referencing the same physical memory space, the track can be copied. A physical copy of the original track can later be written as a background process to a second memory location, if so desired. Alternatively, when a program that can access the track writes data to or modifies the track in any way, the modified track is written to a new physical memory location and the corresponding address pointers are changed to reflect the new location of this rewritten track.

This apparatus therefore instantaneously moves the original track without the time penalty of having to copy the track to the data processor 11 and then write the track to a new physical memory location on the data storage subsystem 3 via data channel 21. For the purpose of enabling a program to simply access the track at a different virtual address, the use of this mechanism provides a significant time advantage. In this fashion, a track can be instantaneously copied by simply creating a new memory pointer and the actual physical copying of the track can take place as a background process without the involvement of the data processor 11.

Operation of DASD File System Copy System

FIG. 2 illustrates in flow diagram form the operation of the DASD file system copy system DC, as implemented in the system environment described above. The DASD file system copy system DC is illustrated herein as a data file management process which is extant on the data processor 11, although other implementations, such as merging the functionality of the DASD file system copy system DC into the other software running on data processor 11, are possible. In operation, an application process AP, extant on data processor 11, requests the creation of a copy of an existing data file at step 201, which data file is stored on a virtual device on a one (for example DSS 3) of the data storage subsystems connected to data processor 11. The DASD file system copy system DC, in response to the receipt of a data file copy request, which includes an identification of the selected (source) data file, locates the identified source data file at step 202. The data file location operation comprises the DASD file system copy system DC searching the data processor 11 data file storage information to identify the data storage location of the identified source data file. The DASD file system copy system DC searches the DSCB entries of the Virtual Table of Contents (VTOC) stored in the memory of data processor 11 and executes device type queries where necessary to thereby determine the physical location and file system of the identified source data file as designated by the data processor 11. However, the data storage subsystem 3 stores data for the data processor 11 in virtual volumes, a plurality of which are implemented in data storage subsystem 3, as for example 256 logical DASD volumes. Thus, the data file location information obtained by the DASD file system copy system DC comprises the data processor view of the data storage location in which the selected source data file is stored on data storage subsystem 3.

The DASD file system copy system DC, in response to the receipt of a data file system copy request, also locates or allocates a target location for the storage of the copy of the selected source data file at step 203. The DASD file system copy system DC searches the existing meta data of data processor 11 and executes device type queries where necessary to thereby determine the physical location of available memory space of sufficient extent to store the copy of the identified source file system. However, the data storage subsystem 3 stores data for the data processor 11 in virtual volumes, a plurality of which are implemented in data storage subsystem 3 and the file system location information obtained by the DASD file system copy system DC comprises the data processor view of the data storage location in which the copy of the selected file system is stored on data storage subsystem 3.

Once the source and target locations are identified, the DASD file system copy system DC must review the characteristics of the source and target virtual devices, to determine whether the data file snapshot copy process can be activated. If the snapshot copy process is available for this operation, the DASD file system copy system DC, at step 204, builds a set of ECAM channel programs to activate the copying of the identified source data file, and the associated creation of data file pointers. In operation, the DASD file system copy system DC creates an ECAM channel message for each extent of tracks that are to be copied in the identified source data file. These ECAM messages are submitted serially to the data storage subsystem 3 to effect the data file copy operation. In particular, the DASD file system copy system DC issues an ECAM Source Definition message to the data storage subsystem 3 to define both the Source & Target Locations as well as the Extents for both of these locations. The DASD file system copy system DC transmits the ECAM Source Definition message to the data storage subsystem 3 over the data channel 21 which connects these two systems in well known fashion. The ECAM Source Definition message is used to prepare the data storage subsystem 3 for the execution of the data file snapshot copy operation and also functions as a security measure. The security aspect of the process involves the passing of a token at step 205 from the data storage subsystem 3 to the DASD file system copy system DC to tie the received data with future instructions received from the DASD file system copy system DC. In response to the receipt of the ECAM Source Definition message, the data storage subsystem 3 stores the received Source and Target Location data as well as the Extent data for future use.

The DASD file system copy system DC at step 206 generates an ECAM Target Execution message which instructs the data storage subsystem 3 to execute the requested snapshot copy operation, using the Source and Target Location, and Extent data received in the previous ECAM Source Definition message. This message is tied to the previously transmitted ECAM Source Definition message by the inclusion of the token which was received from the data storage subsystem 3 in the previously executed ECAM Source Definition message exchange. The data storage subsystem 3 uses the token included in the ECAM Target Execution message to identify the stored Source and Target Location and Extent data to perform the snapshot copy operation in well known fashion. Since the snapshot copy operation executes independent of the data processor, the data storage subsystem 3 returns a data file copy acknowledgment message, including a polling token, at step 207 to the DASD file system copy system DC on data processor 11. This polling token enables the DASD file system copy system DC to query the data storage subsystem 3 to ascertain the completion status of the data file copy process, which physical copy is created as a background process, as noted above.

The data file copy query is implemented via the use of an ECAM Status Inquiry message, which comprises a status inquiry message. The DASD file system copy system DC inserts the polling token in the ECAM Status Inquiry message to identify the particular data file snapshot copy operation of interest and transmits the message at step 208. The data storage subsystem 3 responds to a received ECAM Status Inquiry message by returning a response at step 209 indicative of snapshot copy completed status. The DASD file system copy system DC can originate as many ECAM Status Inquiry messages as needed until the data storage subsystem 3 transmits a response to the ECAM Status Inquiry message which indicates successful completion of the data file snapshot copy operation.

Once the data file snapshot copy operation is competed, the DASD file system copy system DC at step 210 must update the meta data associated with the source data file and the target data file. The meta data comprises: VTOC; Volume labels; VTOC index; Virtual Volume Data Set (VVDS) data, which is known by the data processor 11. The DASD file system copy system DC updates this data in well-known fashion to accurately reflect the location and attributes of the data file created by the snapshot copy operation. At this juncture, the data file snapshot copy operation is completed and processing exits at step 211.

SUMMARY

The DASD file system copy system therefore functions to enable the data processor to manage the data file copy function of a disk data storage subsystem in a manner that minimizes the expenditure of data processor resources. This is accomplished by the DASD file system copy system determining the source location on the data storage subsystem, the target location on the data storage subsystem and identifying the extents of both. The DASD file system copy system then transmits data to the data storage subsystem, representative of the assignment of DASD full tracks from the source location on the data storage subsystem as well as DASD full tracks from the target location on the data storage subsystem. The data processor based DASD file system copy system then uses ECAM channel programs to instruct the data storage subsystem to perform the data file copy operation using snapshot track pointer copy operations. This eliminates the need for the data processor to be intimately involved in the execution of the data file copy operation eliminating the associated cycle and elapse time.

What is claimed:

1. A data file system copy apparatus for the copying of data files stored on a dynamically mapped virtual memory data storage subsystem having a rewriteable memory space, which data file copy apparatus is extant on a data processor connected to the data storage subsystem which is operational to instantaneously create a copy of a selected data file independent of said data processor, said data file copy apparatus comprising:

means for allocating memory in said rewriteable memory space for a selected data file written thereon as well as for a copy of said selected data file;

means for transmitting control messages to said data storage subsystem to identify said selected data file, and memory space for said copy of said selected data file, comprising:

means for transmitting data to said data storage subsystem to initiate activation of a snapshot copy operation on said selected data file in said data storage subsystem independent of said data processor; and means, responsive to said data storage subsystem copying said selected data file, for updating meta data associated with said data file and known by said data processor.

2. The data file copy apparatus of claim 1 wherein said means for allocating memory comprises:

means for determining a location and an extent of said selected data file.

3. The data file copy apparatus of claim 2 wherein said means for allocating memory further comprises:

means for determining a location and an extent of said copy of said selected data file.

4. The data file copy apparatus of claim 1 further comprising:

means for transmitting control messages to said data storage subsystem to initiate said copy of said selected data file.

5. The data file copy apparatus of claim 1 wherein said means for transmitting control messages comprises:

means for transmitting data to said data storage subsystem to identify a location and an extent of said selected data file, and a location and an extent for said copy of said selected data file.

6. A data file system copy apparatus for the copying of data files stored on a dynamically mapped virtual memory data storage subsystem having a rewriteable memory space, which data file copy apparatus is extant on a data processor connected to the data storage subsystem which is operational to instantaneously create a copy of a selected data file independent of said data processor, said data file copy apparatus comprising:

means for allocating memory in said rewriteable memory space for a selected data file written thereon as well as for a copy of said selected data file;

means for transmitting control messages to said data storage subsystem to identify said selected data file, and memory space for said copy of said selected data file; and means, responsive to said data storage subsystem copying said selected data file, for updating meta data associated with said data file and known by said data processor, comprising:

means for updating at least one of data file meta data comprising: Virtual Table of Contents(VTOC); Volume labels; VTOC index; Virtual Volume Data Set (VVDS) data.

7. The data file copy apparatus of claim 6 wherein said means for allocating memory comprises:

means for determining a location and an extent of said selected data file.

8. The data file copy apparatus of claim 7 wherein said means for allocating memory further comprises:

means for determining a location and an extent of said copy of said selected data file.

9. The data file copy apparatus of claim 6 further comprising:

means for transmitting control messages to said data storage subsystem to initiate said copy of said selected data file.

10. The data file copy apparatus of claim 6 wherein said means for transmitting control messages comprises:

means for transmitting data to said data storage subsystem to identify a location and an extent of said selected data file, and a location and an extent for said copy of said selected data file.

11. The data file copy apparatus of claim 10 wherein said means for transmitting control messages further comprises:

means for transmitting data to said data storage subsystem to initiate activation of a snapshot copy operation on said selected data file in said data storage subsystem.

12. A data file copy method for the copying of data files stored on a data storage subsystem having a rewriteable memory space, which data file copy method is executable on a data processor connected to the data storage subsystem which is operational to instantaneously create a copy of a selected data file independent of said data processor, said data file copy method comprising the steps of:

allocating memory in said rewriteable memory space for a selected data file written thereon as well as for a copy of said selected data file;

transmitting control messages to said data storage subsystem to identify said selected data file, and memory space for said copy of said selected data file, comprising:

transmitting data to said data storage subsystem to initiate activation of a snapshot copy operation on said selected data file in said data storage subsystem independent of said data processor; and updating, in response to said data storage subsystem copying said selected data file, meta data associated with said data file and known by said data processor.

13. The data file copy method of claim 12 wherein said step of allocating memory comprises:

determining a location and an extent of said selected data file.

14. The data file copy method of claim 13 wherein said step of allocating memory comprises:

determining a location and an extent of said copy of said selected data file.

15. The data file copy method of claim 12 further comprising the step of:

transmitting control messages to said data storage subsystem to initiate said copy of said selected data file.

16. The data file copy method of claim 12 wherein said step of transmitting control messages comprises:

transmitting data to said data storage subsystem to identify a location and an extent of said selected data file, and a location and an extent for said copy of said selected data file.

17. A data file copy method for the copying of data files stored on a data storage subsystem having a rewriteable memory space, which data file copy method is executable on a data processor connected to the data storage subsystem which is operational to instantaneously create a copy of a selected data file independent of said data processor, said data file copy method comprising the steps of:

allocating memory in said rewriteable memory space for a selected data file written thereon as well as for a copy of said selected data file;

transmitting control messages to said data storage subsystem to identify said selected data file, and memory space for said copy of said selected data file; and updating, in response to said data storage subsystem copying said selected data file, meta data associated with said data file and known by said data processor, comprising:

updating at least one of data file meta data comprising: Virtual Table of Contents(VTOC); Volume labels; VTOC index; Virtual Volume Data Set (VVDS) data.

18. The data file copy method of claim 17 wherein said step of allocating memory comprises:

determining a location and an extent of said selected data file.

19. The data file copy method of claim 18 wherein said step of allocating memory comprises:

determining a location and an extent of said copy of said selected data file.

20. The data file copy method of claim 17 further comprising the step of:

transmitting control messages to said data storage subsystem to initiate said copy of said selected data file.

21. The data file copy method of claim 17 wherein said step of transmitting control messages comprises:

transmitting data to said data storage subsystem to identify a location and an extent of said selected data file, and a location and an extent for said copy of said selected data file.

22. The data file copy method of claim 21 wherein said step of transmitting control messages further comprises:

transmitting data to said data storage subsystem to initiate activation of a snapshot copy operation on said selected data file in said data storage subsystem.

* * * * *